E. WINARSKY.
AUTOMATIC DRAINING DEVICE.
APPLICATION FILED JUNE 29, 1912.
1,074,591.
Patented Sept. 30, 1913.
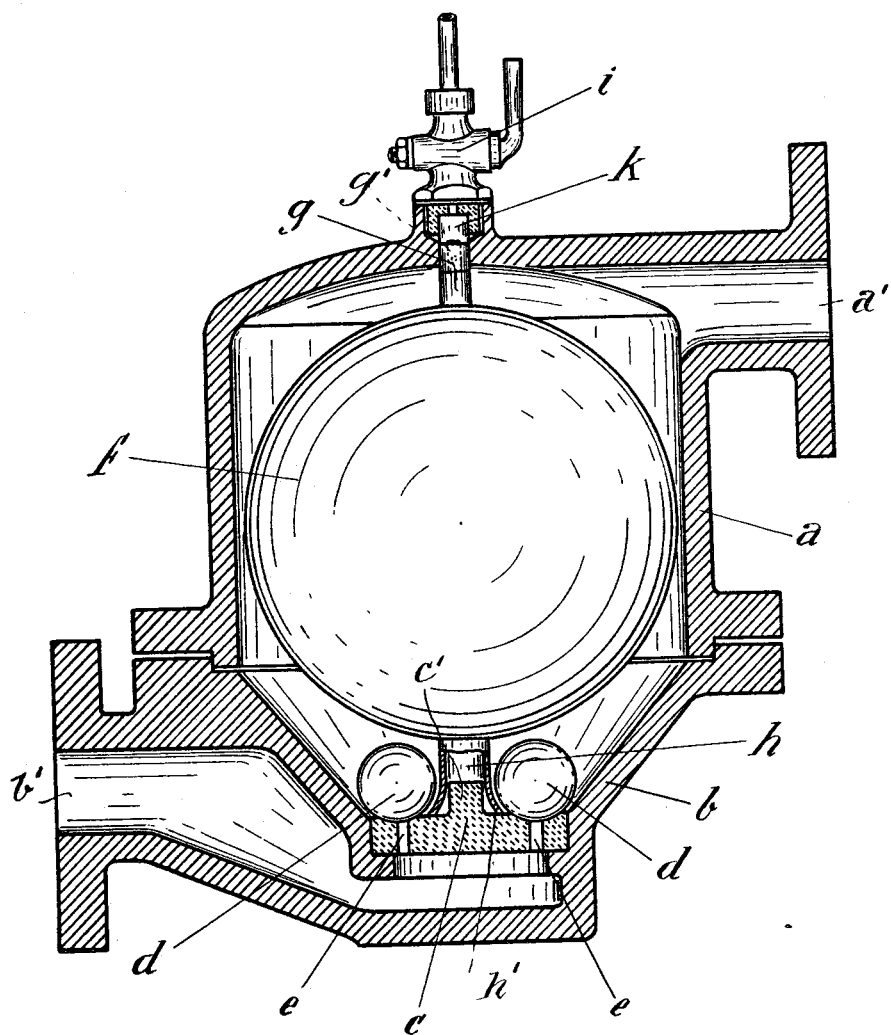

UNITED STATES PATENT OFFICE.

EDMUND WINARSKY, OF BRUNSWICK, GERMANY, ASSIGNOR TO RICHARD NAURER, OF BRUNSWICK, GERMANY.

AUTOMATIC DRAINING DEVICE.

1,074,591.  Specification of Letters Patent.  Patented Sept. 30, 1913.

Application filed June 29, 1912. Serial No. 706,758.

*To all whom it may concern:*

Be it known that I, EDMUND WINARSKY, a subject of the Emperor of Germany, residing at Brunswick, Germany, have invented certain new and useful Improvements in ............ ........... Devices; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention relates to automatic draining devices such as are employed for trapping the water from steam pipes and automatically discharging this water from time to time.

The object of the present invention is to provide an automatic draining device which shall be free of all internal levers and jointed parts, and which may be readily blown through for the purposes of cleaning and clearing the passages. This and other features of the invention will be more readily understood from the following description of one convenient form illustrated by way of example in the accompanying drawing, which shows a cross section through an automatic draining device according to this invention.

The draining device embodies a receptacle $a$, which, in the present case, is provided with a conical bottom $b$, so as to act as a guide to the gravity valves hereinafter described. At the bottom of the conical base $b$, there is arranged a valve seat $c$, on which a plurality of gravity valves, shown as ball valves $d$, are arranged to rest. The ball valves $d$, control outlet passages $e$, having cupped tops to fit the ball valves. The valve seating plate $c$, is provided with an upstanding circular projection $c'$, which takes into a pipe or tube $h$, fixed to the bottom of a float $f$, in the chamber or receptacle $a$. The tube or pipe $h$, has a flared or expanded end $h'$, which takes under the ball valves $d$. It will be seen that the ball valves are all separate and in no way connected to the tube $h$. The tube $h$, thus forms an independent member fixed to the float and arranged centrally to the symmetrically disposed ball valves. When the conical bottom $b$, and the receptacle $a$, become sufficiently filled with water the float $f$, rises and the flared end of the tube $h$, engages loosely with the ball valves. The ball valves are thus pressed to the side against the conical walls of the bottom $b$, and when the float drops the conical walls guide the ball valves on to their seats. The water passing through the passages $e$, finds its outlet at $b'$.

In order to blow the apparatus through for cleaning purposes the following arrangement is provided. On the top of the float $f$, there is a stem $g$, over which may be passed a piston or the like $g'$. This piston may be fixed on to the stem in any convenient manner or formed in one therewith. The piston $g'$, is adapted to fit into a sleeve $k$, over which there is arranged a snifting valve $i$. With this arrangement it will be seen that when the snifting valve is open the pressure on the spherical float $f$, is uneven. Thus the entire pressure is operating on the lower half, whereas on the upper half the area on which the pressure is acting is reduced by the area of the piston $g'$. Thus, if the area of the piston $g'$, were one square centimeter and the steam pressure were five atmospheres, there would be an excess upward pressure on the float $f$, of five kilograms. This upward force would overcome the weight of the sphere and the resistance of the valves to being rolled up the inclined sides and the friction of the piston $g$ with the sleeve $k$. It is obvious that the magnitude of this upward force is dependent on the product of the pressure per unit of area and the area of the piston $g'$, and it is readily understood that other things being equal, a smaller pressure per unit of area will require the piston $g'$ to be of larger area than if the pressure were larger. In order that the draining device may be easily altered so as to suit a lower pressure, the piston $g'$, which is removable, can be replaced by a larger piston, the sleeve $k$, being bored out to receive it. The steam or the like from which water or moisture is to be abstracted enters by the inlet $a'$.

It will be seen that in the above arrangement no levers or jointed parts are employed in the float chamber, and that the blowing through of the apparatus is very simply effected by opening the snifting valve. A further advantage rests in the use of a number of valves as this prevents, to a great extent, any stoppage or clogging of the entire passage and in cases where small parts of solid matter, such as scale, have to be passed the ball valves *d*, may completely roll back so as to give a free uninterrupted passage. In such cases the conical bottom guides the balls back on to their seats as they fall by gravity when the float descends.

I claim:

1. An automatic draining device, having in combination a receptacle, a plurality of separate outlet valves located symmetrically at the lower end of said receptacle, a float in said receptacle, a member fixed to said float and arranged centrally to, but independent of, said valves to engage the same loosely and open them when the float rises.

2. An automatic draining device having in combination a receptacle, a conical base on said receptacle, a plurality of gravity valves located in a circle at the lower narrow end of said base, a float in said receptacle, a member fixed to said float and arranged centrally to, but independent of, said valves to engage the same loosely and open them when the float rises, substantially as described.

3. An automatic draining device having in combination a receptacle, a float therein, an outlet at the lower end thereof, a plurality of symmetrically disposed ball valves controlling said outlet, an expanded tube carried by said float and having its expanded end located centrally to engage and open said ball valves when the float rises.

4. An automatic draining device having in combination a receptacle, a float therein, a conical base on said receptacle, an outlet from the lower narrow end of said conical base, a plurality of ball valves arranged in a circle at the lower end of said base and controlling said outlet, a tube carried by said float and having a flared end taking under said ball valves to spread and open the same when the float rises.

5. An automatic draining device having in combination a receptacle, a float therein, a conical base on said receptacle, an outlet from the lower narrow end of said conical base, a plurality of ball valves arranged in a circle at the lower end of said base and controlling said outlet, a tube carried by said float and having a flared end taking under said ball valves to spread and open the same when the float rises, and a fixed guide fitting loosely into said flared tube.

6. An automatic draining device, having in combination, a receptacle, a plurality of separate outlet valves located symmetrically at the lower end of said receptacle, a float in said receptacle, a member fixed to said float and arranged centrally to, but independent of said valves, means for raising said float for cleaning purposes, comprising a stem on said float, a sleeve engaging over said stem, said stem fitting tightly in said sleeve and a snifting valve for controlling the outlet of fluid from said sleeve above the top of the aforesaid stem, substantially as and for the purpose hereinbefore set forth.

7. An automatic draining device, having in combination, a receptacle, a plurality of separate outlet valves, located symmetrically at the lower end of said receptacle, a float in said receptacle, a member fixed to said float and arranged centrally to, but independent of said valves, means for raising said float, for cleaning purposes, comprising a stem on said float, a removable piston on said stem, a sleeve engaging over said piston, said piston fitting tightly in said sleeve and a snifting valve for controlling the outlet of fluid from said sleeve above the top of the aforesaid piston, substantially as and for the purpose hereinbefore set forth.

8. An automatic draining device having in combination a receptacle, a conical base on said receptacle, an outlet from the lower narrow end of said conical base, a plurality of ball valves located in a circle at the lower end of said conical base and controlling said outlet, a float in said receptacle, a tube fixed to said receptacle and having a flared end located to engage and spread said ball valves when said float rises, a stem on the top of said float, a sleeve in which said stem fits and a snifting valve located on said sleeve above said stem.

9. An automatic draining device comprising a receptacle having an inclined bottom, said bottom having an opening, a ball valve normally closing the opening, and a float mounted in the receptacle, said float having a projection which loosely engages the under portion of the ball valve to roll the latter up the inclined wall and uncover the opening when the float rises, the ball valve rolling down the inclined wall and over the opening when the float is lowered.

In testimony whereof I have signed my name to this specification in the presence of two subscribing witnesses.

EDMUND WINARSKY.

Witnesses:
HEINRICH KONEFEL,
JULIUS SECKEL.

It is hereby certified that the name of the assignee in Letters Patent No. 1,074,591, granted September 30, 1913, upon the application of Edmund Winarsky, of Brunswick, Germany, for an improvement in "Automatic Draining Devices," should have been written and printed *Richard Maurer* instead of "Richard Naurer," as shown by the record of assignments in this office, and that the said Letters Patent should be read with this correction therein that the same may conform to the record of the case in the Patent Office.

Signed and sealed this 9th day of December, A. D., 1913.

[SEAL.]

J. T. NEWTON,

*Acting Commissioner of Patents.*